US011526381B2

(12) United States Patent
Bhattacharya et al.

(10) Patent No.: US 11,526,381 B2
(45) Date of Patent: Dec. 13, 2022

(54) SYSTEM AND METHOD FOR INFRASTRUCTURE RESOURCE OPTIMIZATION

(71) Applicant: Nice Ltd., Ra'anana (IL)

(72) Inventors: Pratim Kumar Bhattacharya, Pune (IN); Sameer Pokarna, Pune (IN); Yuvraj Amrutrao Sawant, Nigdi (IN)

(73) Assignee: NICE LTD., Ra'anana (IL)

( * ) Notice: Subject to any disclaimer, the term of this patent is extended or adjusted under 35 U.S.C. 154(b) by 164 days.

(21) Appl. No.: 17/094,143

(22) Filed: Nov. 10, 2020

(65) Prior Publication Data

US 2022/0147397 A1 May 12, 2022

(51) Int. Cl.
*G06F 9/46* (2006.01)
*G06F 9/50* (2006.01)

(52) U.S. Cl.
CPC ................................ *G06F 9/5038* (2013.01)

(58) Field of Classification Search
CPC ..................................................... G06F 9/5038
See application file for complete search history.

*Primary Examiner* — Gregory A Kessler
(74) *Attorney, Agent, or Firm* — Pearl Cohen Zedek Latzer Baratz LLP

(57) ABSTRACT

A system and method of altering computer resource allocation may include receiving a first time-series metric describing a processes; receiving a second time-series resource metric describing a computer resource; and analyzing the first time-series metric and the second time-series resource metric as an independent and a dependent variable to determine a gradient coefficient defining the ratio of the rate of change between the first time-series metric and the second time-series resource metric. The result may be used to predict resource usage, and to provision or allocate the resource accordingly.

22 Claims, 9 Drawing Sheets

| | Correlation |
|---|---|
| | 0.91 |

| Time | Independent | Dependent |
|---|---|---|
| 1:00 | 4 | 15 |
| 2:00 | 5 | 16 |
| 3:00 | 6 | 15 |
| 4:00 | 7 | 14 |
| 5:00 | 9 | 25 |
| 6:00 | 7 | 17 |
| 7:00 | 6 | 15 |
| 8:00 | 5 | 13 |
| 9:00 | 4 | 10 |
| 10:00 | 0 | 4 |

Fig. 2C

SYSTEM AND METHOD FOR INFRASTRUCTURE RESOURCE OPTIMIZATION

FIELD OF THE INVENTION

The present invention relates generally to analysis of computer and data infrastructure usage, real-time auto-scaling and allocation of resources, in particular to analysis of infrastructure resource usage resulting in optimized resource provisioning and allocation.

BACKGROUND OF THE INVENTION

In a traditional dedicated computer and data hosting environment, e.g. in a cloud computing environment, resource allocation is limited to the availability of the hardware resources of the hosting environment. For example, applications executing as part of a dedicated hosting environment suffer from performance bottlenecks and possibly crash as the hosting environment resources are maxed out. Applications requiring additional computing resources must scale computing resources to meet or match the application's additional computational or data storage load.

However, with the advent of cloud computing, compute resources have become dynamically available to different users, via a network connection such as the Internet, based on when and how long they are needed, and then terminated when they are no longer needed. Such flexibility to dynamically allocate resources ("scaling") allows for fully scalable computing systems based on users' need and demand. Cloud providers typically use a "pay-as-you-go" model, whereby operating expenses are based on provisioning (e.g. allocation or dedication of resources to a user) and not what is actually used. Often, cloud services are overprovisioned or oversized for the amount of resources actually needed resulting in both wasted resources and higher operating expenses. Fine-tuning cloud infrastructures is therefore important for cost optimization.

Organizations such as call centers, or other businesses, may want to achieve cost optimization via computing resource allocation. One such method is known in the art as auto-scaling whereby computational resources vary automatically (e.g. scale up or scale down) based on the infrastructure load. However, decisions of scaling up or down of infrastructure resources are currently reactive in nature. Prevailing resource provisioning optimization techniques are based on technical parameters like Computer Processing Unit or memory utilization, which may not provide accurate or timely predictions of usage.

Auto scaling up or down is a proven technique for cost optimization, but existing systems do not accurately determine how and when to apply the optimization to have the least impact on business operations.

SUMMARY

Embodiments provide a system and method of improving provisioning or auto-scaling using leading and lagging indicators. A lead indicator may be a time-series trend which occurs before the actual event and is proactive nature. For example, the number of concurrent agents logged-in to a call center may be a lead indicator or business process which proactively determines a lagging indicator, which may be an indicator which is reactive in nature. For example, a lagging indicator may be the amount of computerized recording device resources needed as a result of additional agents logged-in (in some cases as a result of intermediate processes also represented by leading and lagging indicators). The leading and lagging indicator may be analyzed on time-series data for example previously obtained to provide a model to predict future leading indicators.

A system and method of altering computer resource allocation may include receiving a first time-series metric describing a process or set of events; receiving a second time-series resource metric describing a computer resource; and analyzing the first time-series metric and the second time-series resource metric as an independent and a dependent variable to determine a gradient coefficient defining the ratio of the rate of change between the first time-series metric and the second time-series resource metric. The result may be used to predict resource usage, and to provision or allocate the resource accordingly.

Embodiments provide a system and method of computer resource allocation using independent and dependent variables. An independent variable may be a variable whose variation, in a certain context, does not depend on that of another. For example, the number of concurrent agents logged-in in a call center may be an independent variable as it may be the case where the number of concurrent agents logged-in is not affected by any other variable, or in this context, can be controlled. An independent variable may directly affect a dependent variable, in a cause and effect relationship. For example if the independent variable is the number of concurrent agents logged-in in a call center, then the dependent variable may be the amount of recording device resources or other computing resources required as a result of the concurrent agents logged-in. When the number of concurrent agents increase, the amount of recording devices resources used may also increase, however prior art methods do not allow for a precise and accurate prediction of the computing resource increase. The increase may or may not be direct as there are multitudes of factors to account for (e.g. may not be directly proportional, for example the change in magnitude might be different, or may not be instant, there is a time-lag in the resulting change), however, it may be said that any manipulation of the independent variable will cause a change in the dependent variable.

Embodiments provide a system to deduce the load on recording and cloud storage in a contact center environment. During a normal shift in a contact center environment, agents log in to the contact center systems and start attending to customer calls. The log in of agents may result in an increased need for other downstream processes e.g. call recording and subsequently storage of the recording. The analysis of system metrics e.g. how many concurrent agents are logged-in, the resulting cloud storage provisioning may be used to deduce the load on recording and cloud storage in a contact center environment. Thus, this provides a system for just in time optimization which is based on the number of logged in contact center agents (as the leading indicator) to provide triggers for scaling up/down the infrastructure that is proven to have cascading impact on the downstream system (recording and storage).

Embodiments provide a system and method of detecting the need for resource re-allocation and altering computer resource allocation that uses a first time-series metric, e.g. a business metric or measurement, which describes a process such as a business processes and a second time-series resource metric or measurement describing a computer resource. The first and second time-series business metrics may be analyzed as an independent and a dependent variable to determine a gradient coefficient defining the ratio of the rate of change between the first time-series business metric and the second business metric. The computer resource is then allocated based on the gradient coefficient.

Embodiments provide a system and method for an auto-scaling decision system that decides on scaling (e.g. allocating, de-allocating, bringing on or off line, or provisioning) up or down infrastructure based on business trigger and co-relation indicators. The auto-scaling decision may include actions executed by a computer system which substitute for actions taken by a user operating a computer system. A computing device may receive or obtain a business metric, or a set of business metrics, the business metric describing activity, processes, business processes. Such business processes include, but are not limited to e.g., numbers of agent logins, concurrent devices, type of device connected, geographical location. The process or business process need not be related to human activity: for example, the process or business process may be the number of devices being active, the amount of a certain computer resource being active, etc. For example, concurrent devices may be devices connected to a common infrastructure/server (e.g. mobile devices such as Apple iPhone devices, laptops such as MacBook laptops, personal computing devices connected to LAN or WAN network). A business process may also be or track the type of device connected which may affect resources (e.g. server computing units may exhibit less graphical processing power than personal workstations). A business process may also track geographical location of the connecting device, for example, higher latency connections results in lost 'true' resources, effectively reducing available resources. A business process may be any measurable activity or set of activities which accomplish a specific business or other goal, and which, as described herein, may use, affect, or be correlated with physical resources such as computing resources, and the levels of use of such resources.

Such business processes may be represented as a set of variables. Business processes may be defined as independent variables, variables whose variation does not depend on that of another variable, and dependent variables, variables whose variation depends on that of an independent variable. For example, these variables exist in Amazon Web Services (AWS) CloudWatch, a monitoring and observability service provided for data and insights to monitor applications, respond to system-wide performance changes, optimize resource utilization, and get a unified view of operational health.

Decision making may be based on a leading indicator which may help in proactive autoscaling decision.

Embodiments may be used to scale a resource that is different than the resource used by a leading indicator.

Decisions may be driven from business indicators that is closer to real usage pattern. Thus the lead indicator may not be very far away from lagging events in history, resulting in systems not scaling up or down based on some event that happened, e.g. last week or last year.

While examples herein concern agents at a call center, the application of this invention is generic and shall be applicable to any domain/industry.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 2C is an example dataset with a correlation coefficient greater than 0.90 according to embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 2A:
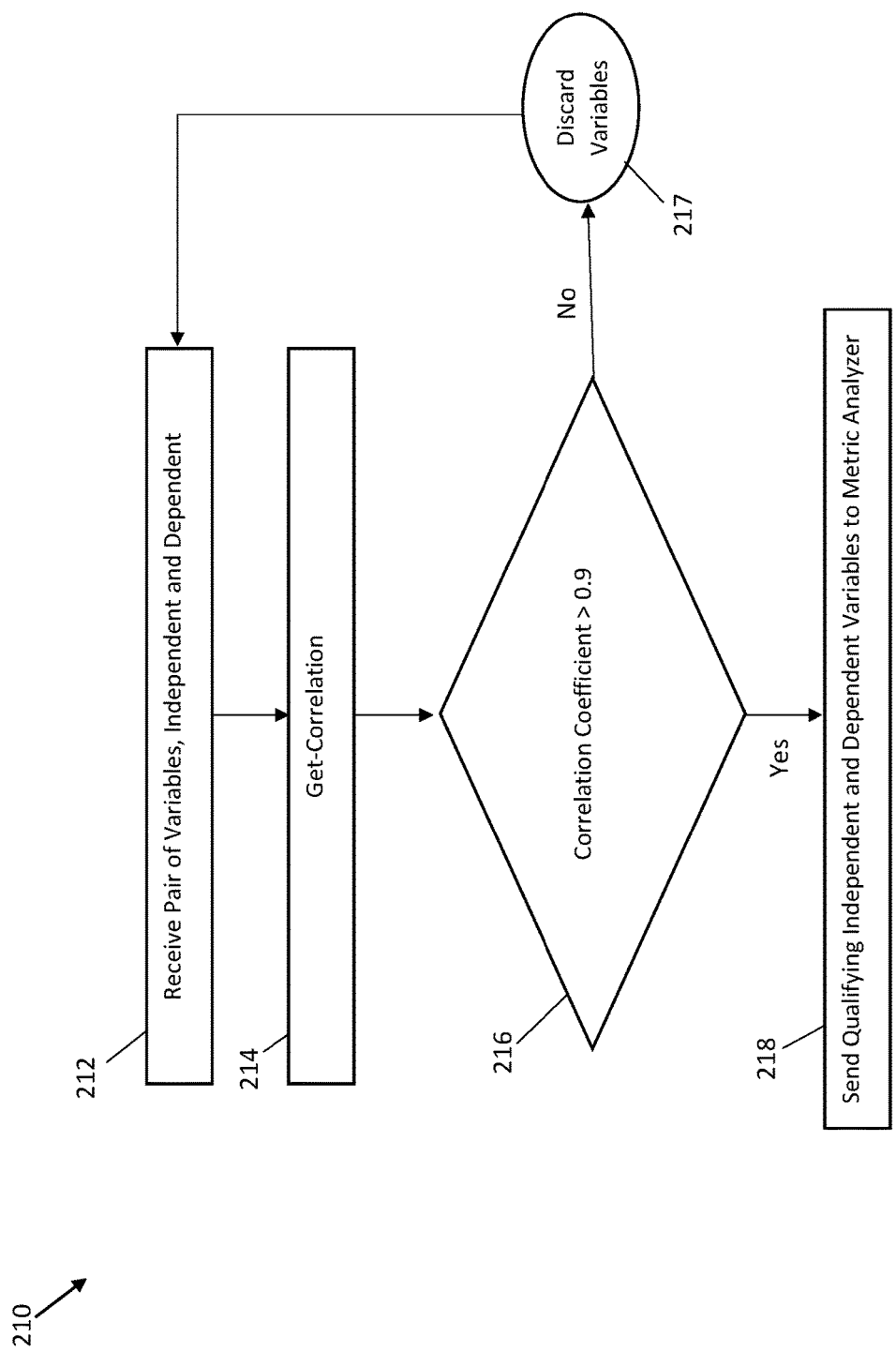
FIG. 2A is a flowchart of the method of a Correlation Validator sub-module according to embodiments of the present invention.
Figure 2B:
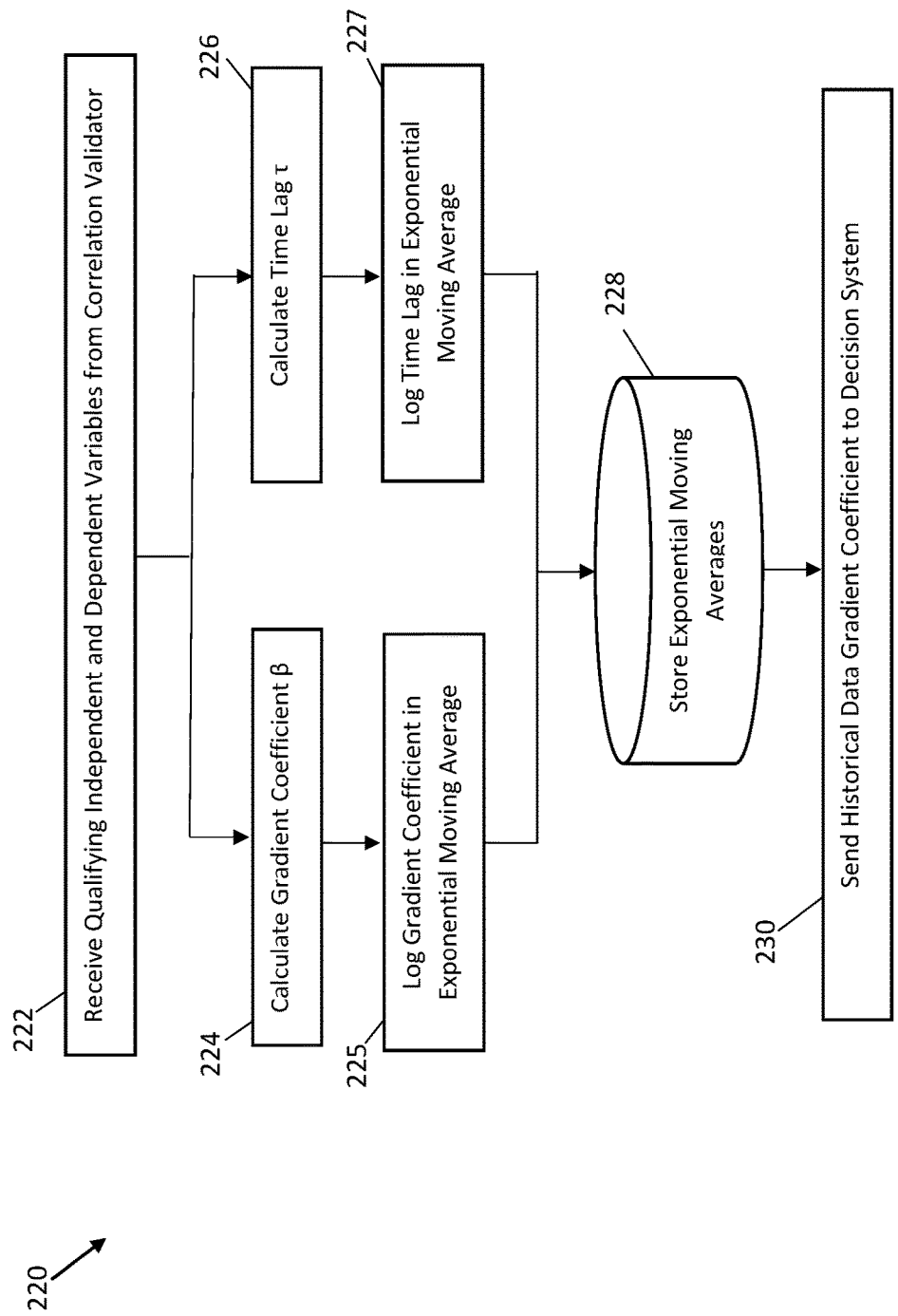
FIG. 2B is a flowchart of the method of a Metrics Analyzer sub-module according to embodiments of the present invention.
Figure 3A:
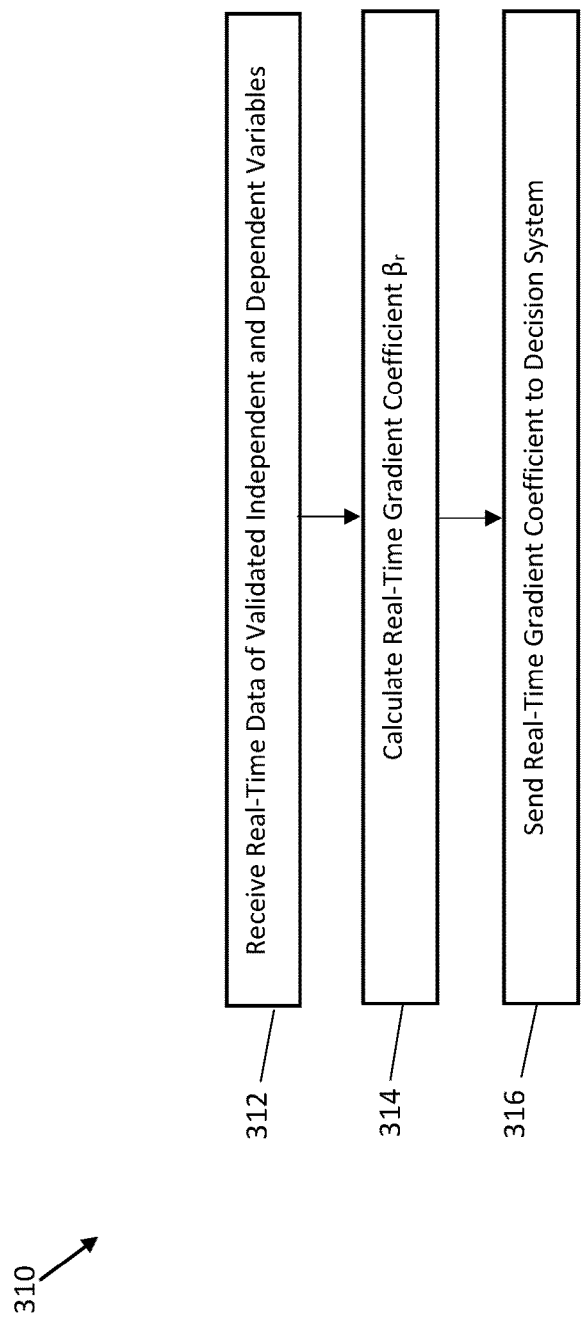
FIG. 3A is a flowchart of the method of a Real-Time Data Feed sub-module according to embodiments of the present invention.
Figure 3B:
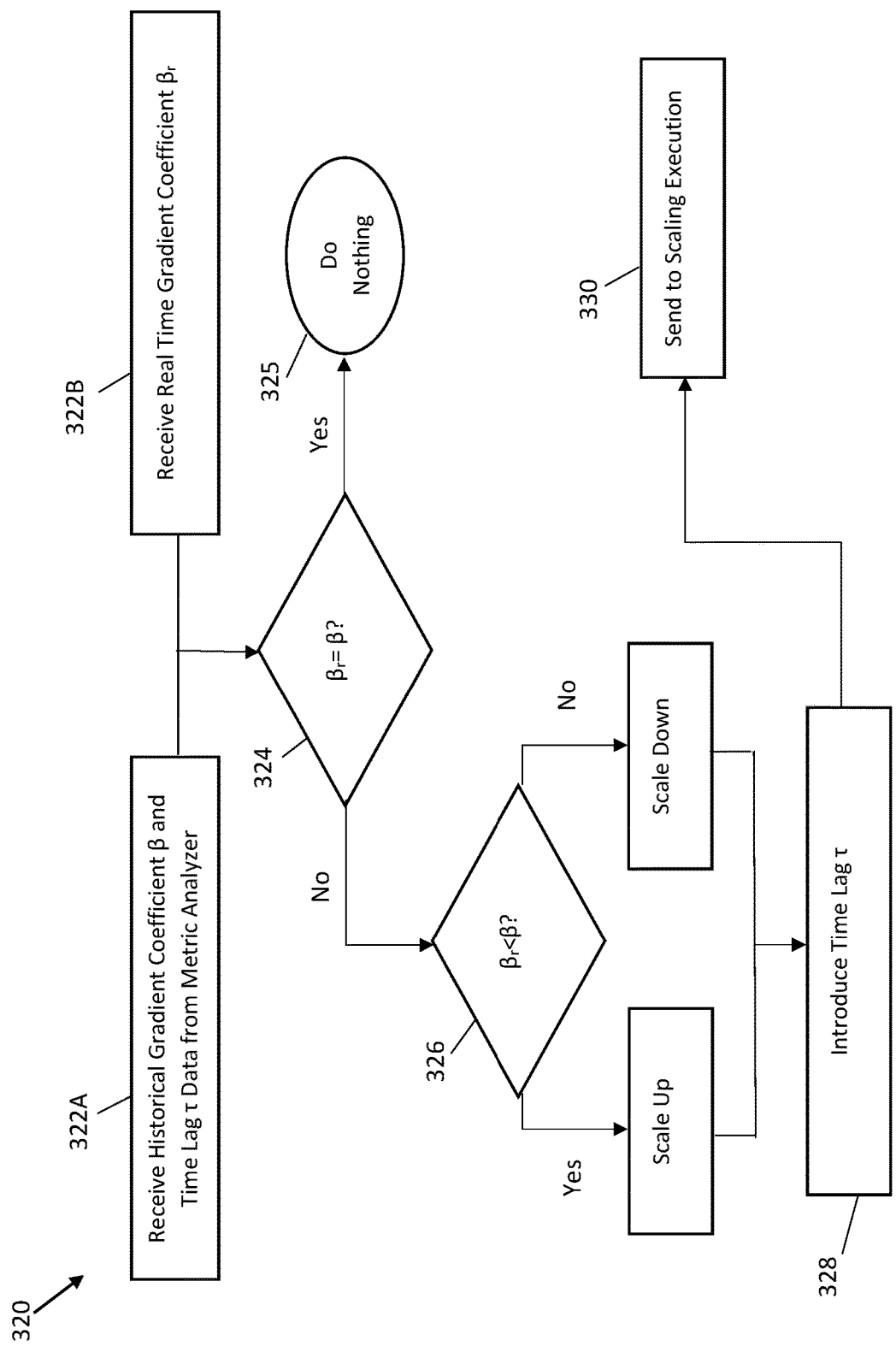
FIG. 3B is a flowchart of the method of a Decision System sub-module according to embodiments of the present invention.

Embodiments provide a system and method to forecast computer resource allocation. Embodiments provide a process for example embodied in an engine and decision system to trend historical data between a time-series independent and a correlated time-series dependent variable to determine when and how much to alter the real-time resource based on the historical trend. In a first stage, an example of which is shown in FIGS. 2A and 2B, the trend of historical data includes the calculation of both the gradient coefficient and time lag between a received correlated time-series independent and time-series dependent variable. The time-series independent variable may describe or relate to a business process metric or measurement and the time-series dependent variable relates to a resource metric or measurement correlated to the time-series independent variable. For example, in a call center environment, data may be collected regarding the number of concurrent agents logged in, and this may be tracked as a business process metric and used or identified as an independent variable. Additional data may be collected in a call center environment, for example, the amount of recording devices used, may be tracked as a resource metric or measurement. Before trending data, the relationship between the data collected may be established as part of a correlation calculation and stored (e.g. by the Graphs Database of FIG. 1). For example, upon a call center agent's login, additional resources which may need to be allocated, such as the amount of recording devices needed, may be calculated to be directly correlated to the number of concurrent agents logged in. Therefore, the business process metric (e.g. concurrent call agents logged-in) may denote a time-series independent variable which influences (e.g. highly correlated to) a time-series dependent variable affecting a resource (e.g. recording devices). The established correlated relationship between the independent and dependent variable may be used to calculate trends which may be used to determine real-time behavior. For example, a correlating relationship between the number of concurrent agents logged-in and the amount of recording devices may be used to calculate the gradient coefficient and the time-lag between these time-series independent and dependent variables. Embodiments of the invention are not limited to business processes, an event e.g. company restructuring, department reorganization, etc. may be a metric or measurement which impacts a resource metric or measurement describing resource usage. In a second "in-use" stage, an example of which is shown in FIGS. 3A and 3B, previously calculated factors such as a gradient coefficient and time-lag between the independent and dependent variables may be trended and used to forecast real-time behavior, and to alter the allocation or provisioning of resources. This may include continual or periodic monitoring of the identified independent variable to determine if its relationship to the dependent variable has changed such that provisioning needs to occur. For example, a gradient coefficient can be calculated for real-time data to trend the behavior between the real-time independent and dependent variables, the real-time number of concurrent agents and the amount of recording devices used. The real-time gradient coefficient may be compared to historical trends data (e.g. historical gradient coefficient and time-lag), such that real-time behavior may be forecasted by the historical trends data. The comparison results in a decision to allocate computer resources by how much and when. The calculated time-lag may provide the delay before resources are allocated.

Embodiments may determine co-related processes, such as business processes, in a system, and then to analyze the impact on a dependent process by observing the change in an independent one. Co-related business processes may have relationships, the complementing business process having a baselining relationship with a resource. In some embodiments, the analysis performed may be performed across a chain of more than two processes defined by time-series data. For example, a first business process (e.g. agent log-in) may be determined to be represented by an independent variable, which may affect a process described by first dependent variable (e.g. recorder usage). The first dependent variable (e.g. recorder usage) may in turn be an independent variable affecting a second dependent variable (e.g. memory usage by recorders), and this second dependent variable may be provisioned or allocated. A process defined as in FIGS. 2 and 3 may be extended to cover more than just one pair of dependent-independent variables and their associated processes and resources.

Embodiments may determine a trend, predicting in real-time by observing the operational metrics of independent process, the expected change in dependent process metrics and hence the infrastructure requirement of the dependent process.

Embodiments may be applied to call center technologies resource allocation (e.g., in the NICE LTD. CxOne system). Business processes in for example call center environments or other environments may be examined, for example, at the instance of a call center agent's login, identifying information such as the time of an agent's login is recorded. For a call center environment, information on how many and when agents log in may be collected or trended, in a time-series business metric or measurement. As a result of an agent's login, additional resources are allocated for agents to utilize, such as application programming interface (API) calls for additional recording devices. Information on how many and when (e.g. API calls) these additional recording devices are allocated may be trended, in a time-series resource metric. The pair of business metric and resource metrics may be defined as an independent variable and a dependent variable for analysis, respectively. The rate of change of the independent variable may be calculated and compared to the rate of change of the dependent variable, to calculate or determine the ratio of the rate of change of the independent variable to the dependent variable, which may be defined as the gradient coefficient. The gradient coefficient may therefore be used as a value determining how much additional resources are needed in response to a change (e.g. increase or decrease) in how many call center agents log in. The calculated gradient coefficient may be the value which the auto-scaling of resources determines how much is altered or provisioned.

Embodiments may determine resource allocation through transitive dependency of variables representing those resources. For example, in a call center environment, an independent variable such as the number of concurrent agents may not directly impact cloud storage resources. However, due to the call center process of storing the recording of the agent interaction, the dependent storage process may affect the amount of recording resources allocated. Therefore, by the transitive nature of the independent and dependent variables, the number of concurrent agents may directly impact the resources needed to store the agent interactions.

Embodiments may provide data trending to real-time data points. In certain embodiments, real-time or recent data is given higher weight or priority over time-advanced data.

Figure 1:
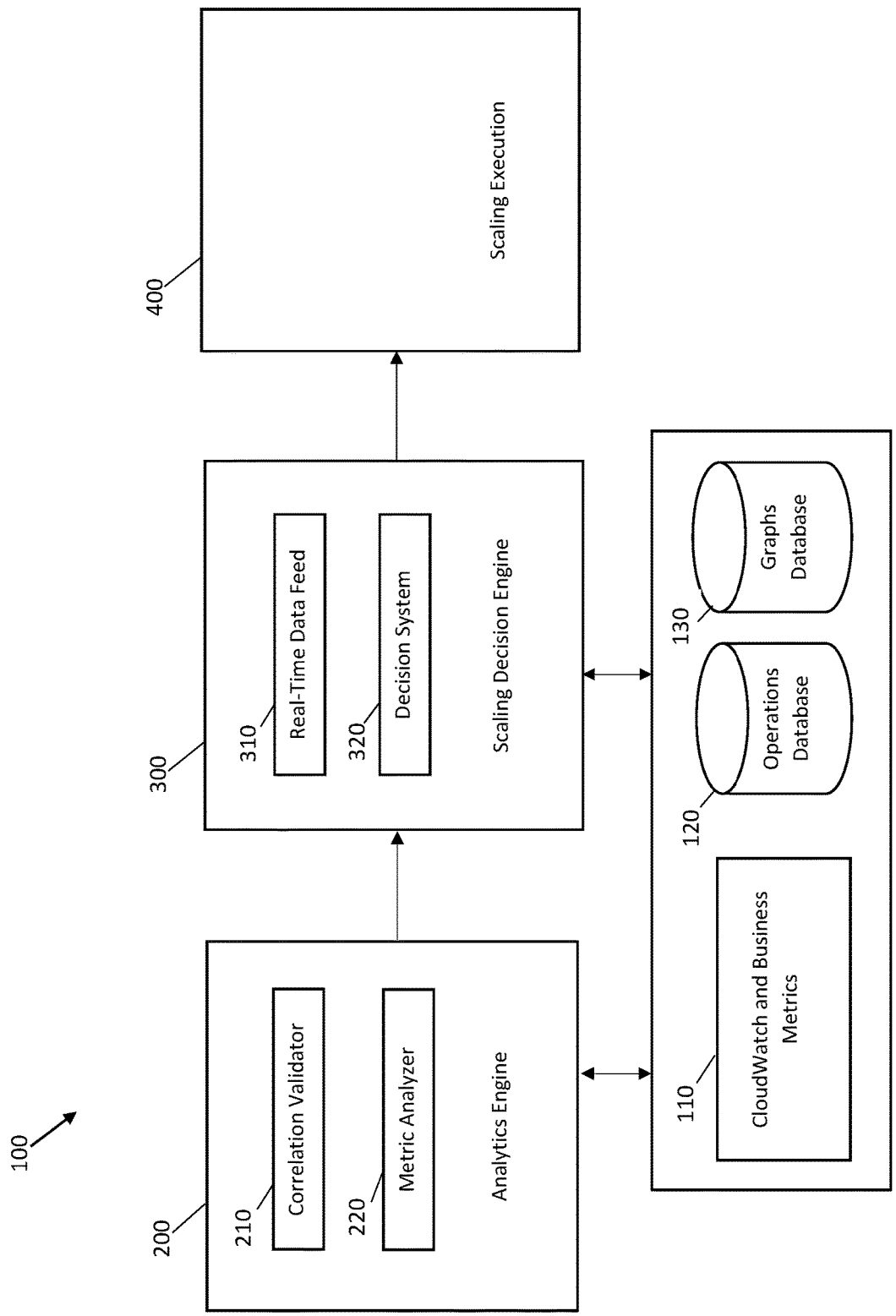
FIG. 1 is a high-level block diagram of an exemplary system according to embodiments of the present invention.

Reference is now made to FIG. 1 which is an high level block diagram of an exemplary system 100 for computer resource auto-scaling. Auto-scaling in cloud computing may monitor applications and may automatically alter or change capacity to maintain steady, predictable performance at lowest possible cost. Altering or changing a resource may encompass provisioning of compute resources (e.g. scaling vertically (up or down), horizontally (in or out)); altering or provisioning may include, for example, changing the amount of memory, storage, or equipment dedicated to a specific user. For example, scaling vertically refers to provisioning CPU, memory, or I/O resources to an existing server or the replacement of such a server with a more powerful server. Such alterations may be accomplished by changing instance sizes in AWS, for example, changing Elastic Compute Cloud (EC2) instances to changing Relational Database Service (RDS) databases. In the context of Microsoft Azure, changing virtual machine (VM) instances to changing structured query language (SQL) databases. Scaling horizontally refers to provisioning additional servers to meet resource needs. In the AWS or Microsoft Azure environment, horizontal scaling refers to adding additional instances.

Figure 4:
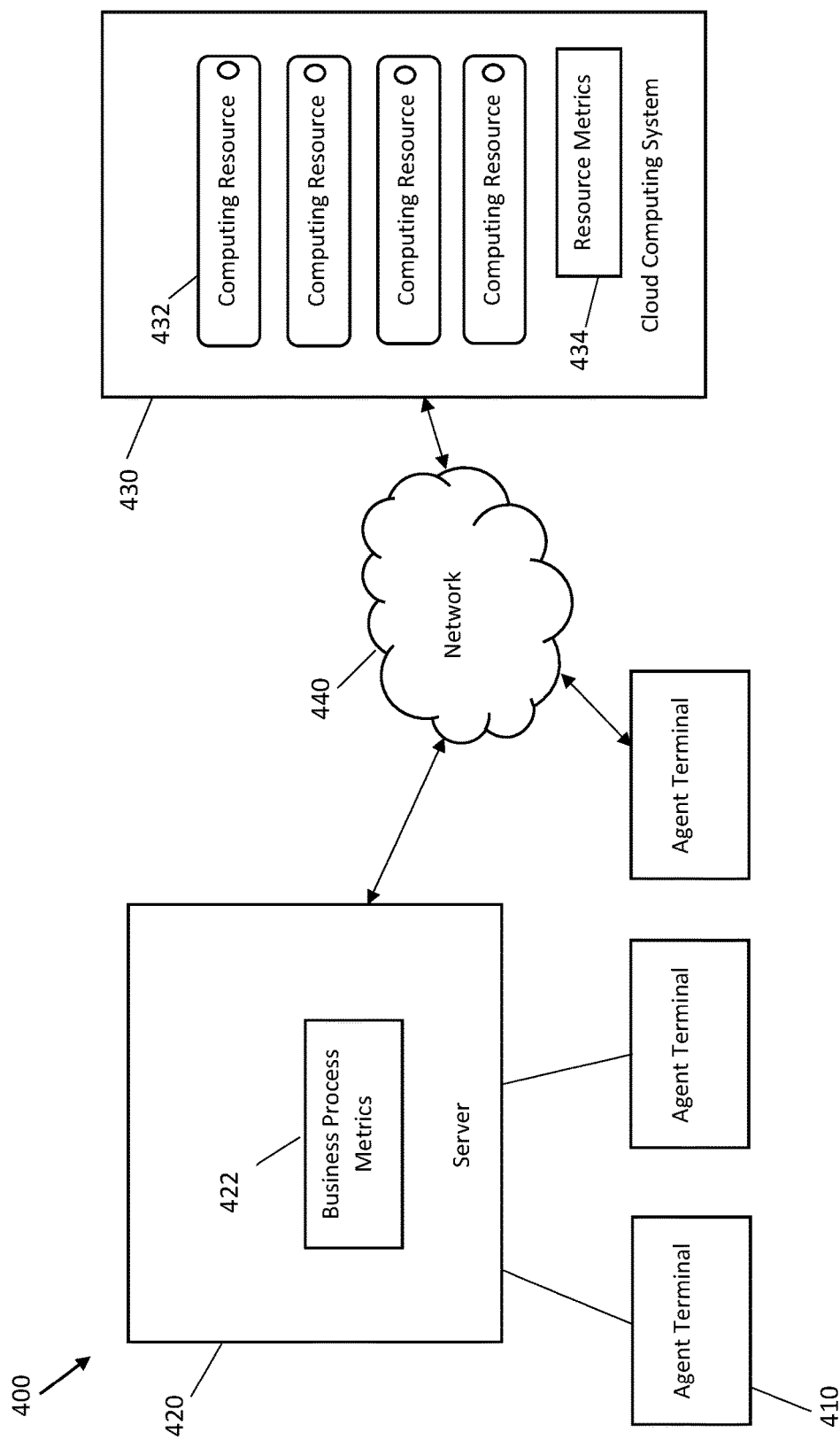
FIG. 4 is a high-level block diagram of an exemplary call center system according to embodiments of the present invention.

An embodiment of a system may include for example analytics engine 200, scaling decision engine 300, and scaling execution 400, connected in sequential order. Analytics engine 200 is connected to the scaling decision engine 300 which is connected to scaling execution 400. Analytics engine 200 includes two sub-modules, the correlation validator 210 and metric analyzer 220. Data may be received from metrics repositories 110 such as Amazon CloudWatch and/or other business process metrics (e.g. Microsoft Azure provides Azure Monitor). Analytics engine 200 may be responsible for validating the co-relation between a business metric and a resource metric (an independent and dependent variable), for example, if the correlation of the business metric and resource metric are above a certain threshold, they are then correlated and validated. Analytics engine 200 may then use the validated independent and dependent variables to provide data to the scaling decision engine 300. The scaling decision engine 300 may include for example two sub-modules, the real-time data feed 310 and the decision system 320. Upon receiving validated independent and dependent variables as provided by the analytics engine 200, the scaling decision engine 300 may receive real-time corresponding time-series data of the independent (business metric) and dependent variable (resource metric) and generate a decision based on provisioning or altering the infrastructure resources. The time-series data may be stored in operations database 120 as variables and properties. The graphs database 130 is used to store the relationships between the variables, with the dependency information. This mainly includes the relationship between the dependent and independent variables. The scaling decision may then be sent to the scaling execution 400 such that proper execution may take place. For example, a decision to scale-up computational resources may be provided to scaling execution 400, which may execute a scaling or provisioning decision, for example APIs provided by Amazon Web Services to perform the altering or provisioning operations on AWS infrastructure. Scaling execution may be an automatic process, e.g. executed by a computer system such as shown in FIG. 4, or may be a human implemented process.

FIG. 2A is a flow diagram illustrating the correlation validator 210 sub-module corresponding to the analytics engine 200. While in an example embodiment a correlation validator is shown as performing certain functions, in other embodiments, systems other than those depicted in the figures may perform functions described in FIG. 2A, the other flowchart figures, and other functions described herein. The correlation validator 210 may be configured to receive (e.g. from Operations Database 120 and Graphs Database 130) as input for example a pair of time-series variables (or measurements) 212: an independent variable time-series variable, sample or measurement describing a metric of a process or series of events (e.g. people logging on to a computer system, an activity or process that may create demand for computer resources, etc.), e.g. a business metric, and a dependent time-series variable describing a resource metric or measurement. A resource metric or measurement describing a computer resource may describe a level or use of a computer resource: e.g. megabytes of storage used, number of routers used, etc., and may measure such usage at discrete ordered points in time. While a business metric or measurement is described, the activity need not be related to "business": rather any activity, human or other, may be measured by a time-series measurement. A time-series variable or measurement may be for example a set of quantities or measurements, each quantity or measurements referring to a sequenced point in time. For example, in the example of call centers, the independent time-series variable may have quantities of the number of agents logged-in at a specific time, this time may be logged in sequenced time unit intervals (e.g. seconds, minutes, hours, weeks, etc.). The dependent time-series variable, for example, may describe the amount or number of recording devices used and at what time these recording devices are used. The time-series independent and dependent variables or measurements may be selected manually or selected methodically to achieve high correlation. For example, a methodic approach may involve tagging a pool of metrics data (e.g., obtained from AWS CloudWatch) which may be tagged as either an independent or a dependent variable. The metrics tagged as dependent variables are tied to resources which may be scaled up or down. The computer can therefore randomly select a metric from the independent variables pool and another metric from the dependent variables pool and check for correlation. The independent and dependent time-series variables may then be received or obtained by the correlation validator and calculated for correlation in step getcorrelation 214. The calculation of correlation may involve determining the covariance of the independent and dependent variables. The covariance may be calculated using for example the following formula; as with other example formulas presented herein, other formulas may be used:

$$Cov(X, Y) = \frac{\sum (X_i - \overline{X})(Y_j - \overline{Y})}{n - 1}$$

where the covariance is the product of the differences of the independent variable X and dependent variable Y from their respective sample means. $X_i$ defines each sample of the independent variable and $Y_i$ defines each sample of the dependent variable, divided by n−1, where n denotes the number of data points (the number of X and Y sample pairs selected).

In order to determine the correlation, the covariance may be divided by the product of the standard deviations of independent variable X and dependent variable Y. The correlation coefficient r is given by the following example formula:

$$r = \frac{Cov(X, Y)}{S_X S_Y}$$

where $S_X$ is the standard deviation of independent variable X and $S_Y$ is the standard deviation of dependent variable Y. Correlation as known in the art, may be computed by several types of correlation coefficients, one example commonly used coefficient being the Pearson's Correlation r value.

Once the correlation is calculated, a decision 216 may be made regarding the relationship between the independent and dependent variables. In order to determine whether the independent and dependent variables exhibit a high degree of correlation, a correlation coefficient of r>0.90 may be used as a threshold to determine if the independent and dependent variables qualify for further analysis. As with specific values and thresholds discussed herein, other values may be used. For example, in the call center example, using the assumption that more agents (independent variable) should require more recording resources (dependent variable), the dataset of the independent and dependent variables may be examined for a positive correlation value of, for example, 0.90 or greater (as with other limits or thresholds described herein, other numbers may be used). An example dataset providing a correlation coefficient of greater than 0.90 is shown in FIG. 2C. In the example, hourly throughout the day, from the hours of 1:00 to 10:00, an independent variable was tracked and a corresponding dependent variable relating to a resource was tracked. Using the above correlation coefficient calculation method, where X is the independent variable and Y is the dependent variable with a n=10 samples, this dataset results in a correlation coefficient of 0.91. Therefore, if the dataset has a correlation of 0.90 or greater, this qualifies the independent and dependent variables for further analysis. The resulting qualified independent and dependent variables may then be sent to the metrics analyzer for further analysis in step 218 and the dependency stored in graphs database 130. If the correlation coefficient do not meet these thresholds, the independent and dependent variables may be discarded in step 217 and the process may repeat with a different set of independent variables. Although the Pearson's r value is used in this example embodiment, the invention is not limited to the type of correlation coefficient used.

After validation of the independent and dependent variable, at periodic intervals the independent and dependent may be re-evaluated for correlation by for example a correlation validator. The re-evaluation may be done e.g., daily, weekly, monthly, etc., as appropriate. The re-evaluation ensures historical accuracy of data as new data may deviate the correlation between two variables.

FIG. 2B is a flow diagram illustrating operations of an example metrics analyzer 220 sub-module corresponding to the analytics engine 200. Metrics analyzer 220 may be configured to receive or obtain the qualifying correlated independent and dependent variables from the correlation validator 210 as input 222. The independent and dependent variable data values may be received and calculated to determine one or more mathematical patterns. Patterns of interest may include the gradient coefficient β 224 and the time-lag τ 226 between the independent and dependent variables. The gradient coefficient β may be calculated by determining the ratio of the gradient (e.g. 'slope') between the independent and dependent variables. At any point in the time-series data between the independent and dependent variable, the gradient coefficient β may describe the amount of resources used for a specific period of time. For example, returning to the call center example, assuming that dependent events were immediate (no time-lag), and under the assumption that when agent logins (e.g. a business process) increased by 100%, recording device usage (e.g. a computing resource) immediately increased by 30%. Therefore, the ratio of the rate of change of the percentage of the dependent variable over the independent variable may effectively describe the gradient coefficient β. In this example, the gradient coefficient β is 0.3 determined by the dividing the 30 percent of the dependent variable over the percentage of the independent variable (100 percent). A gradient coefficient of 0.3 effectively describes the resource usage per unit increase of the independent variable and therefore also describes the amount of resources to increase (or decrease) given the increase (or decrease) in the independent variable. A linear regression algorithm may be used to calculate the gradient coefficient.

Often, the independent and dependent variables do not coincide in time and there is a time difference between when the gradient coefficient change is detected and when the auto-scaling or provisioning should be done. The dependent variable is often reactive in nature, resulting in an observed time-lag. The observed time-lag defines the time to observe a change in the dependent variable after a change in the independent variable. For example, when call center agent logins increase, there might not be an immediate increase in the usage of recording devices. Agents could observe short delays before starting work calls (e.g. check e-mails, back-log items, etc.), therefore the increase in the usage of recording devices is often not immediate and involves an observed time-delay τ. This observed time delay may be accounted for before calculations can be accurately made. In order to calculate the observed time-delay, an algorithm may be used. First, a time-frame (e.g., same start and end time) parallel to both the independent and dependent variable is selected. The time frame may be any length suitable for analysis, for example, the time-frame duration may be daily, for a daily moving average analysis, or it may be every three months, for a software cycle analysis. The algorithm calculates the observed time-delay by estimating the time delay at which the correlation reaches its maximum value. To find the maximum correlation given the time series independent and dependent variables, one of the variables may be anchored while the other is shifted through time by estimated time lag values. The algorithm may use, for example a sigma correlation function, such as for example:

$$Corr(\tau) = \sum_{t=0}^{N-1} s_1(t)s_2(t+\tau)$$

Other correlations may be used. The correlation Con (e.g. similarity between a first time-series function and a second time-series function) for a given time-delay τ is the summation of N samples in the time frame of the product of the anchored time-series function $s_1(t)$ and the estimated time-lag shifted time-series function $s_2(t)$. The correlation function produces a correlation value for each estimated time-lag value. Therefore, to determine the observed time-delay, the estimated time-lag value which yields the maximum correlation value is therefore used as the observed time-delay. Therefore the observed time-delay may be the maximum value of the above correlation function, for example:

Time lag(τ)=max(Corr(τ))

Figure 2D:
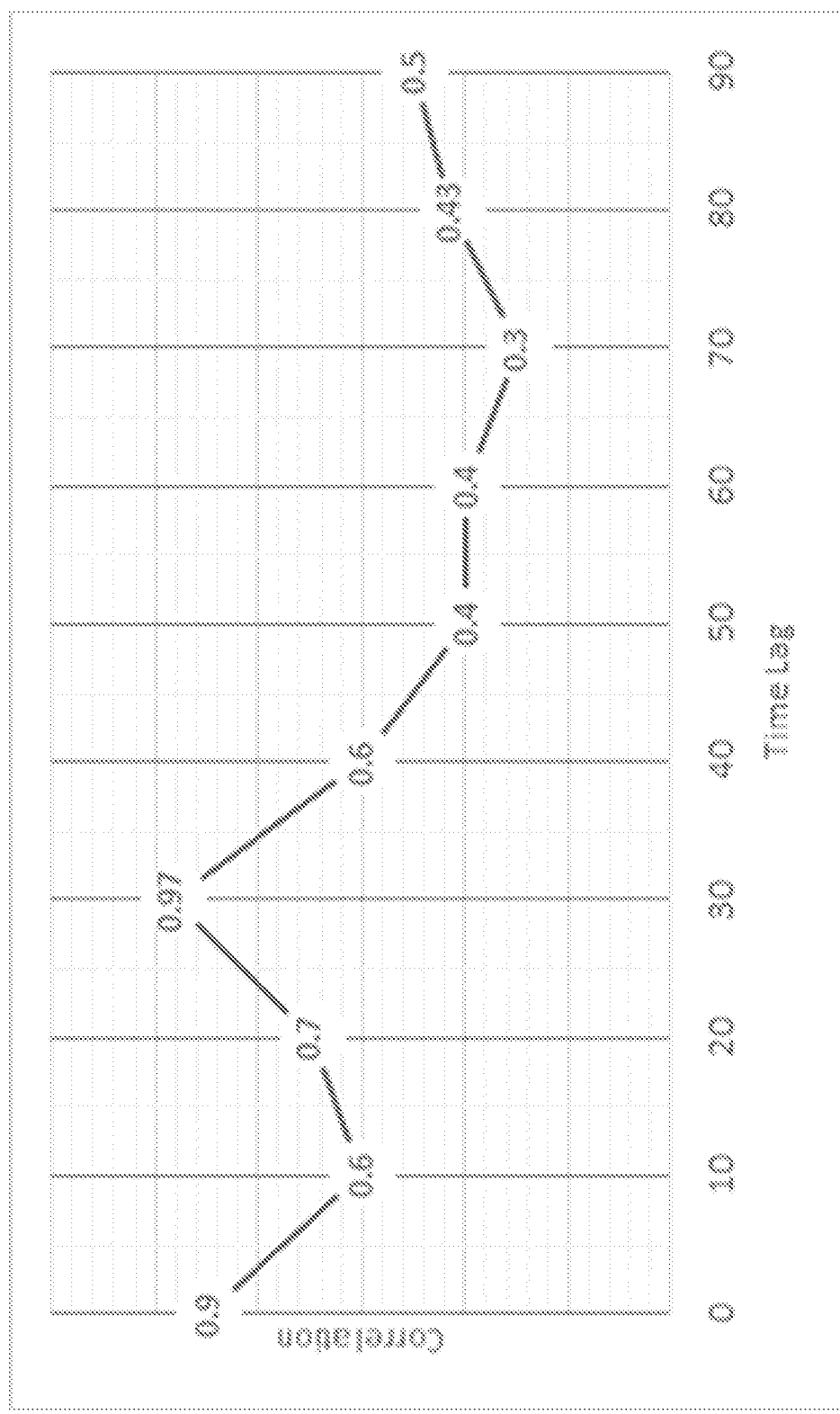
FIG. 2D is an example graph of the calculation method of determining the time-lag according to embodiments of the present invention.

Visually, it may be pictured as shifting one graph over the other and finding the peaks and troughs which majorly coincide, the amount the shifted graph has shifted is therefore the observed time lag. As can be seen in FIG. 2D, a graph of an example correlation between the independent and dependent variables for an estimated time-lag data set is provided. On the y-axis is the correlation value calculated by the above Corr(τ) function plotted over the estimated time-lag in minutes on the x-axis. It can be seen that a correlation value of 0.97 is the maximum value and therefore the observed time-lag is determined to be 30 minutes as this produces the maximum correlation value.

Therefore, at the end of each cycle of data collection (of independent and dependent variables), an algorithm, as above, may be introduced finding the observed time-delay.

This value determines the amount of time to observe before the deployment of resources after a trend is identified, avoiding the premature scaling of resources. E.g. based on the outputted time delay, a person or process may, after a change in the gradient coefficient value of the independent variable wait the time delay to deploy or alter the resource represented by the dependent variable.

In some embodiments, both patterns of interest are observed over a period of a certain period of time, e.g. N days, and compiled in an exponential moving average. Exponential moving averages may place emphasis and weight on more recent data points. The number N days should be configurable to reflect current needs of an organization. For example, for software companies, since software development cycles typically last 3 months, a reasonable N=100 days can be chosen. A compiled gradient coefficient exponential moving average is logged in step 225 for the calculated gradient coefficient 224. A compiled time lag or time separation exponential moving average may be logged in step 227 for the calculated time lag 226. The compiled exponential moving averages of both the gradient coefficients and the time lag are then sent to databases in step 228 (operations database 120 of FIG. 1). The databases then provide this data as input to the scaling decision engine when needed in step 230.

FIG. 3A is a flow chart showing a flow diagram illustrating an example use of real-time data feed 310 corresponding to the scaling decision engine 300. In step 312, the real-time data feed module 310 receives corresponding real-time data of the independent and dependent variables selected as part of the correlation validator sub-module. For example, data may be received from agent terminals 410 or server 420 regarding the number of agents logged on at any point in time. In step 314, similar to the linear regression analysis of historical data as part of metrics analyzer 220, the real-time gradient coefficient $\beta_r$ may be calculated. The real-time gradient coefficient $\beta_r$ is a similar linear regression analysis as that of metric analyzer 220 but is instead performed on the real-time data as opposed to historical data. The gradient coefficient of the real-time data $\beta_r$ may then be sent to the decision system 320 of FIG. 3B to be compared to the historical data gradient coefficient obtained from the metric analyzer 220 in step 316. For example, in the example of call centers, the independent variable may be that of the number of agents logged in whereas the dependent variable may be that of the amount of recording devices used. The real-time data feed sub-module obtains the real-time data of the number of agents logged in and the real-time data of the amount of recording devices used. In this example, a real-time gradient coefficient is then calculated for the aforementioned independent and dependent variables.

FIG. 3B is a flow chart showing a flow diagram illustrating an example decision system 320 corresponding to the scaling decision engine 300. Decision system 320 may forecast the execution of altering the allocation of computer resources (how much and when) based on a previously computed gradient coefficient. As can be seen, the real time gradient coefficient $\beta_r$ calculated as part of the real-time data feed sub-module and the gradient coefficient $\beta$ calculated as part of the analytics engine 220 may be received as input to the decision system in step 322A and 322B, respectively. For example, gradient coefficient $\beta$ may describe the relationship between the change of the number of users logged-in when seen as a time-series number and the resulting alteration of the number of recording device resources used. To make a decision, the gradient coefficient values of both real-time values $\beta_r$ (result of step 316 of FIG. 3A) and historical values $\beta$ (result of step 230 of FIG. 2B) are compared in step 324 to forecast resource allocation. If gradient coefficient values (e.g. of real-time and historical) do not coincide, a decision may be made to alter or provision in step 324. If the gradient coefficient values do coincide, the process may do nothing in step 325 and wait on standby until the gradient coefficient values differ. Whether the autoscaling execution shall scale up or scale down is dependent on the gradient coefficient values in relation to each other seen in step 326. Therefore, if the gradient coefficient of the historical value is greater than the real-time gradient coefficient value, a decision may be made to scale up resources. If however, the opposite was true, a decision may be made to scale down resources.

After this, the scaling decision engine may scale the resources (or send communication or a report to another system (e.g. a cloud service), or to a human operator, to do so accordingly after the time-lag calculated as part of the analytics engine. The time-lag may be introduced at step 328 to schedule the execution of resource scaling proactively. For example, using the above example of the call center, the gradient coefficient between the independent variable of the number of agent logins and the dependent variable of recording device resources may, for example, have a real time gradient coefficient of 0.30 and a corresponding historical gradient coefficient of 0.25. Additionally, the observed time delay or time separation may be calculated to be for example 10 minutes, by the analytics engine, a value which accounts for the reactive nature of the dependent variable. The independent variable may indicate a dependent variable's behavior, but not immediately. The time lag accounts for the difference in the indication of the independent variable and the reactive nature of the dependent variable. For example, call center agents logging in might increase the amount of recording resources used, but not immediately, perhaps with a 10 minute delay as agents might need time to get ready or check email. In some embodiments, the time lag may be affected by having a provisioning signal or report including a time lag, which the entity performing provisioning uses to cause a delay in its provisioning. In other embodiments, the time lag may be affected by delaying the sending of a provisioning signal or report by the time of a time lag. Other specific coefficients and values may be used.

Given this information, the decision system sub-module may forecast and scale down the recording device resources in order to match the historical gradient coefficient. In this case, the historical gradient coefficient is 0.25 whereas the real-time gradient coefficient is 0.30. In order to match the historical gradient coefficient, recording device resources may be scaled down 16.67% (0.30−0.25/0.30) in order to follow historical gradient coefficient trends.

Altering or provisioning may be based on a determined time lag or time separation. The time lag may be used in some embodiments to, when it is determined that provisioning or allocation is to be performed, to create a delay between the time remaining to scale up/down and provisioning. Frequently, it requires some additional time for resources to be deployed and take effect. For example, taking into account the observed time lag, the recording device resources may be altered or provisioned after a 10 minute observed time-delay but only provisioned after 8 minutes. This is under the assumption that a 2 minute duration is needed for the time required to scale up or down the resource. Therefore, the time-lag may be equivalent to the observed time-lag subtracted by the time required to scale up or down the resource.

The resulting decision of how much and when to alter or provision the resources may then be sent to the scaling execution module in step 330, which may alter or provision computing resources (e.g. alter or change the number of routers or recorders, or the amount of storage, allocated to a specific user). Alternately, altering or provisioning may be performed manually, by a person, in reaction to the gradient coefficient.

FIG. 4 shows a high-level block diagram of an exemplary call center system which applies the embodiments of the present invention. Agent terminal 410 may be used by agents (e.g. logging on, performing work such as communicating with customers) may connect to server 420 through network 440 or a direct connection to server 420. Agent terminal 410 may create demand for computing resources: e.g. an agent using agent terminal 410 may create demand for storage, recording, communications or other computing resources at cloud computing system 430. Server 420 may receive time-series data from agent terminals 410 or cloud computing system 430. For example, time-series business process metrics data 422 (e.g. the independent variable) may be received from agent terminals 420 and time series resource metrics 434 (e.g. the dependent variable) may be received from cloud computing system 430 through network 440. Server 420 may analyze data (e.g. calculation of the gradient coefficient and time-lag) and execute allocation or provisioning (e.g. scale-up or scale-down) of cloud computing system 430, or send messages or reports causing provisioning, e.g. to cloud computing system 430. Cloud computing system 430 may include computing resources 432 which are available to be provisioned or allocated by decisions provided from server 420.

Figure 5:
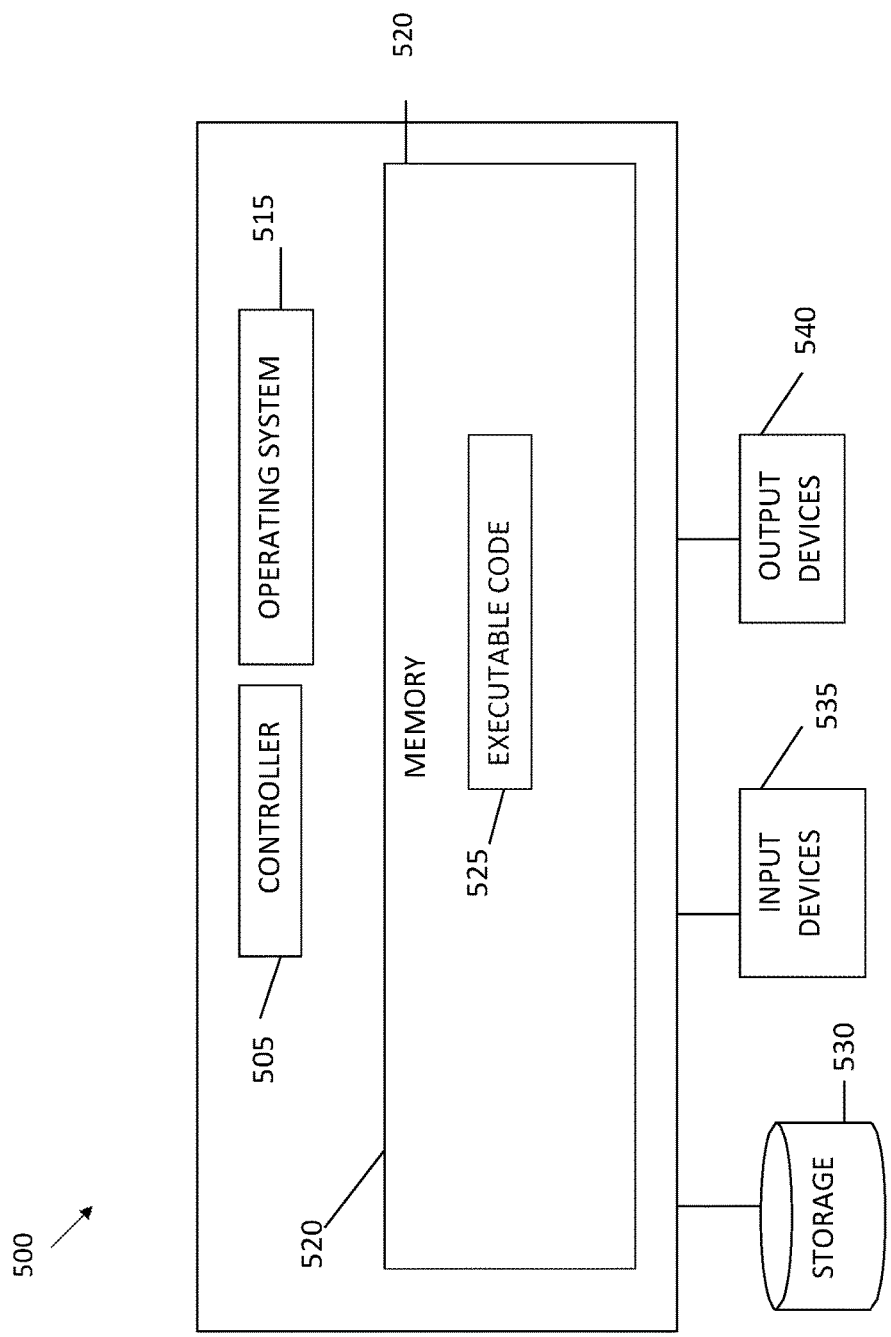
FIG. 5 is a high-level block diagram of an exemplary computing device which may be used with embodiments of the present invention.

FIG. 5 shows a high-level block diagram of an exemplary computing device which may be used with embodiments of the present invention. Computing device 500 may include a controller or processor 505 that may be, for example, a central processing unit processor (CPU), a chip or any suitable computing or computational device, an operating system 515, a memory 520, a storage 530, input devices 535 and output devices 540 such as a computer display or monitor displaying for example a computer desktop system. Each of modules and equipment discussed herein may be or include, or may be executed by, a computing device such as included in FIG. 5 although various units among these modules may be combined into one computing device.

Operating system 515 may be or may include any code segment designed and/or configured to perform tasks involving coordination, scheduling, arbitration, supervising, controlling or otherwise managing operation of computing device 500, for example, scheduling execution of programs. Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 may be or may include a plurality of, possibly different memory units. Memory 520 may store for example, instructions (e.g. code 525) to carry out a method as disclosed herein, and/or data such as low-level action data, output data, etc.

Executable code 525 may be any executable code, e.g., an application, a program, a process, task or script. Executable code 525 may be executed by controller 505 possibly under control of operating system 515. For example, executable code 525 may be one or more applications performing methods as disclosed herein, for example those of FIGS. 2A-3B according to embodiments of the present invention. In some embodiments, more than one computing device 500 or components of device 500 may be used for multiple functions described herein. For the various modules and functions described herein, one or more computing devices 500 or components of computing device 500 may be used. Devices that include components similar or different to those included in computing device 500 may be used, and may be connected to a network and used as a system. One or more processor(s) 505 may be configured to carry out embodiments of the present invention by for example executing software or code. Storage 530 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as user action data or output data may be stored in a storage 530 and may be loaded from storage 530 into a memory 520 where it may be processed by controller 505. In some embodiments, some of the components shown in FIG. 5 may be omitted.

Input devices 535 may be or may include a mouse, a keyboard, a touch screen or pad or any suitable input device. It will be recognized that any suitable number of input devices may be operatively connected to computing device 500 as shown by block 535. Output devices 540 may include one or more displays, speakers and/or any other suitable output devices. It will be recognized that any suitable number of output devices may be operatively connected to computing device 500 as shown by block 540. Any applicable input/output (I/O) devices may be connected to computing device 500, for example, a wired or wireless network interface card (NIC), a modem, printer or facsimile machine, a universal serial bus (USB) device or external hard drive may be included in input devices 535 and/or output devices 540.

Embodiments of the invention may include one or more article(s) (e.g. memory 520 or storage 530) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Embodiments of the invention may improve the technologies and cost of cloud computing infrastructures by using specific algorithms and analysis to optimize large resource pools (e.g. processors, data recorders, memory, hard drives, routers, network equipment), a task which is impossible, in a practical sense, for a person to carry out.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of altering cloud computer resource allocation, the method comprising:
   receiving by a processor a first time-series metric describing a process performed by a first computer system;
   receiving by the processor a second time-series resource metric describing a computer resource at a cloud computer system;
   analyzing by the processor the first time-series metric and the second time-series resource metric as an independent and a dependent variable to determine a gradient coefficient defining the ratio of the rate of change between the first time-series metric and the second time-series resource metric; and
   based on the analyzing, altering the allocation of the computer resource at the cloud computer system.

2. The method of claim 1, wherein analyzing the first time-series metric and the second time-series resource metric as independent and dependent variables comprises calculating an observed time lag defining the time to observe a change in the dependent variable after a change in the independent variable.

3. The method of claim 1, wherein the method comprises altering the allocation of a computer resource at the cloud computer system based on the gradient coefficient.

4. The method of claim 2, wherein the method comprises altering the allocation of a computer resource at the cloud computer system based on the time lag.

5. The method of claim 1, wherein the gradient coefficient is calculated using linear regression analysis.

6. The method of claim 1, wherein the independent and dependent variables are validated based on a correlation threshold value.

7. The method of claim 1, further comprising analyzing a corresponding real-time first time-series metric and a corresponding second time-series resource metric as an independent and a dependent variable to determine a real time gradient coefficient defining the ratio of the rate of change between the corresponding first time-series metric and the corresponding second time-series resource metric.

8. The method of claim 1, wherein the gradient coefficient is compiled in an exponential moving average.

9. The method of claim 2, wherein the time lag is compiled in an exponential moving average.

10. The method of claim 2, wherein the time lag is calculated by a sigma correlation function.

11. The method of claim 1, wherein altering the allocation of the computer resource at the cloud computer system is performed by a scaling execution module.

12. The method of claim 1, wherein altering the allocation of the computer resource at the cloud computer system comprises an action selected from the group consisting of: changing the numbers of routers used, changing the number of recorders used, and changing the amount of storage used.

13. A system of altering cloud computer resource allocation, comprising:
    a memory; and
    a processor configured to:
       receive a first time-series metric describing a process performed by a first computer system;
       receive a second time-series resource metric describing a computer resource at a cloud computer system;
       analyze the first time-series metric and the second time-series resource metric as an independent and a dependent variable to determine a gradient coefficient defining the ratio of the rate of change between the first time-series metric and the second time-series resource metric; and
       based on the analyzing, alter the allocation of the computer resource at the cloud computer system.

14. The system of claim 13, wherein the processor is configured to analyze the first time-series metric and the second time-series resource metric as independent and dependent variables comprises calculating an observed time lag defining the time to observe a change in the dependent variable after a change in the independent variable.

15. The system of claim 13, wherein the processor is configured to alter the allocation of a computer resource at the cloud computer system based on the gradient coefficient.

16. The system of claim 14, wherein the processor is configured to alter the allocation of a computer resource at the cloud computer system based on the time lag.

17. The system of claim 13, wherein the gradient coefficient is calculated using linear regression analysis.

18. The system of claim 13, wherein the independent and dependent variables are validated based on a correlation threshold value.

19. The system of claim 13, wherein the processor is further configured to analyze a corresponding real-time first time-series metric and a corresponding second time-series resource metric as an independent and a dependent variable to determine a real time gradient coefficient defining the ratio of the rate of change between the corresponding first time-series metric and the corresponding second time-series resource metric.

20. The system of claim 13, wherein the gradient coefficient is compiled in an exponential moving average.

21. The system of claim 14, wherein the time lag is compiled in an exponential moving average.

22. A method of determining a trend in cloud computer resource allocation, the method comprising:
- receiving by a processor a series of measurements describing a set of events occurring at a first computer system;
- receiving by the processor a series of resource measurements describing resource usage at a cloud computer system;
- analyzing by the processor the series of measurements and the series of resource measurements to generate a gradient coefficient defining the ratio of the rate of change between the series of measurements and series of resource measurements; and
- based on the analyzing, altering the allocation of the computer resource at the cloud computer system.

\* \* \* \* \*